United States Patent [19]

Dunski

[11] Patent Number: 5,846,656
[45] Date of Patent: Dec. 8, 1998

[54] STABILIZATION SYSTEMS FOR POLYMERIC MATERIAL IN PELLET FORM

[75] Inventor: Neil Dunski, St. Louis County, Mo.

[73] Assignee: Ciba Specialty Chemicals Corporation, Tarrytown, N.Y.

[21] Appl. No.: 843,607

[22] Filed: Apr. 10, 1997

Related U.S. Application Data

[63] Continuation of Ser. No. 526,035, Sep. 8, 1995, abandoned.

[51] Int. Cl.$^6$ ........................................................ B32B 5/16
[52] U.S. Cl. .................... 428/402; 252/400.24; 252/401; 252/404; 252/405; 252/406; 428/407; 524/100; 524/103; 524/141; 524/145; 524/232; 524/277; 524/291; 524/318; 524/399
[58] Field of Search ..................................... 252/404, 405, 252/400.24, 406, 401; 428/402, 407; 523/351; 524/145, 141, 310, 311, 312, 314, 100, 103, 291, 322, 399, 400, 277, 232, 318

[56] References Cited

U.S. PATENT DOCUMENTS

| | | |
|---|---|---|
| 3,287,480 | 11/1966 | Wechsler et al. . |
| 3,928,263 | 12/1975 | Grant . |
| 4,080,134 | 3/1978 | Klaeysen et al. . |
| 4,146,399 | 3/1979 | Trunley et al. . |
| 4,187,212 | 2/1980 | Zinke et al. . |
| 4,409,351 | 10/1983 | Lee .............................................. 525/5 |
| 4,446,086 | 5/1984 | Molenaar et al. . |
| 4,517,246 | 5/1985 | Matsuyama et al. . |
| 4,737,407 | 4/1988 | Wycech . |
| 4,891,392 | 1/1990 | Abe et al. ................................ 523/351 |
| 4,965,301 | 10/1990 | Leininger ................................. 524/399 |
| 5,028,486 | 7/1991 | Dunski . |
| 5,053,444 | 10/1991 | Trotoir ..................................... 523/351 |
| 5,075,355 | 12/1991 | Hall et al. ................................ 523/351 |
| 5,176,751 | 1/1993 | Findley . |
| 5,236,649 | 8/1993 | Hall et al. ................................ 524/568 |
| 5,298,540 | 3/1994 | Pauquet et al. ............................ 524/94 |
| 5,597,857 | 1/1997 | Thibaut et al. ........................... 524/400 |

FOREIGN PATENT DOCUMENTS

| | | |
|---|---|---|
| 645031 | 7/1962 | Canada . |
| 0008083 | 2/1980 | European Pat. Off. . |
| 0152107 | 8/1985 | European Pat. Off. . |
| 0407138 | 1/1991 | European Pat. Off. . |
| 1792145 | 10/1971 | Germany . |
| 2509571 | 9/1975 | Germany . |
| 52-40566 | 3/1977 | Japan ..................................... 524/227 |
| 55-125148 | 9/1980 | Japan . |
| 58-222147 | 12/1983 | Japan . |
| 63-156831 | 6/1988 | Japan . |
| 818728 | 8/1959 | United Kingdom . |

OTHER PUBLICATIONS

International Search Report dated Feb. 2, 1997 from application PCT/US96/14463, corresponding to this application.

*Primary Examiner*—Veronica P. Hoke
*Attorney, Agent, or Firm*—Luther A. R. Hall

[57] ABSTRACT

A stabilizing system for stabilizing polymeric materials against ultraviolet light and thermooxidative deterioration is provided in which the stabilizing system is in pellet form. The pellet is formed from a substantially dry homogeneous mixture of at least one stabilizer and an agent which will prevent melting of the stabilizer. The stabilizer compound makes up about 50% to about 98% by weight of the mixture. The stabilizers are antioxidants (such as phosphites and hindered phenols) or hindered amine UV light stabilizers, or combinations thereof. The melt preventing agent may be a compound derived from a fatty acid or a fatty alcohol, or a fatty acid or a fatty alcohol, or a combination of fatty acids or fatty alcohols which makes up about 3%–10% of the homogeneous mixture. The fatty acids, fatty alcohols, and the compounds derived therefrom preferably have a low melting point in the range of 50°–100° C. and preferably between 50° C. and about 80° C. The melt preventing agent may alternatively be a lubricating agent having a small particle size (e.g., less than 100 $\mu$) which makes up about 2–50% by weight of the homogeneous mixture.

28 Claims, 2 Drawing Sheets

FIG. 1A

| | No Additive | | added to Stabilizer | | | | | Low Melting Point Additive added to stabilizer | | | | | | | | | | | |
|---|---|---|---|---|---|---|---|---|---|---|---|---|---|---|---|---|---|---|
| Example | 1 | 2 | 5 | 6 | 20 | 33 | 34 | 4 | 9 | 12 | 26 | 10 | 17 | 27 | 18 | 28 | 19 | 29 |
| Irgafos 168 | 50 | | 66.7 | | 90 | 80 | 70 | 15.9 | 95 | 61.5 | 45 | 90 | 64.7 | 45 | 64.7 | 45 | 64.7 | 45 |
| Irganox 1010 | 50 | 16.7 | 33.3 | 100 | 10 | 20 | 30 | | | 31 | 45 | | 32.3 | 45 | 32.3 | 45 | 32.3 | 45 |
| Tinuvin 622LD | | 83.3 | | | | | | 79.1 | | | | | | | | | | |
| Chimassorb 944 | | | | | | | | | | | | | | | | | | |
| Low Melting Point Additives | | | | | | | | | | | | | | | | | | |
| Irganox 1076 | | | | | | | | 5 | 5 | 7.5 | 10 | 10 | | | | | | |
| Glyceryl Monostearate (GMS) | | | | | | | | | | | | | 3 | 10 | | | | |
| Oleamide | | | | | | | | | | | | | | | 3 | 10 | 3 | 10 |
| Fatty Acid | | | | | | | | | | | | | | | | | 3 | 10 |
| Inert Fine Particle addittives | | | | | | | | | | | | | | | | | | |
| Calcium Sterate RSN | | | | | | | | | | | | | | | | | | |
| Hydrotalcite DHT-4A | | | | | | | | | | | | | | | | | | |
| Microthene F LDPE | | | | | | | | | | | | | | | | | | |
| LLDPE | | | | | | | | | | | | | | | | | | |
| Talc ABT2500 | | | | | | | | | | | | | | | | | | |
| ADPRO AP 6120-HS | | | | | | | | | | | | | | | | | | |
| Pellet Yield | 0% | 0% | 0% | 0% | 83% | 36% | 95% | 90% | 80% | 75% | 82% | 80% | 79% | 85% | 43% | 74% | 45% | 55% |
| % Stabilizer | 100 | 100 | 100 | 100 | 100 | 100 | 100 | 95 | 95 | 92.5 | 90 | 90 | 97 | 90 | 97 | 90 | 97 | 90 |
| %Irgafos | 50 | 0 | 67 | 0 | 90 | 80 | 70 | 0 | 0 | 66 | 50 | 0 | 67 | 50 | 67 | 50 | 67 | 50 |
| %Irganox | 50 | 17 | 33 | 100 | 10 | 20 | 30 | 17 | 100 | 34 | 50 | 100 | 33 | 50 | 33 | 50 | 33 | 50 |
| %Tinuvin | 0 | 83 | 0 | 0 | 0 | 0 | 0 | 83 | 0 | 0 | 0 | 0 | 0 | 0 | 0 | 0 | 0 | 0 |
| %Chimassorb | 0 | 0 | 0 | 0 | 0 | 0 | 0 | 0 | 0 | 0 | 0 | 0 | 0 | 0 | 0 | 0 | 0 | 0 |
| %Additive | 0 | 0 | 0 | 0 | 0 | 0 | 0 | 5 | 5 | 7.5 | 10 | 10 | 3 | 10 | 3 | 10 | 3 | 10 |
| %Low Melting | 0 | 0 | 0 | 0 | 0 | 0 | 0 | 5 | 5 | 7.5 | 10 | 10 | 3 | 10 | 3 | 10 | 3 | 10 |
| %Small Part. | 0 | 0 | 0 | 0 | 0 | 0 | 0 | 0 | 0 | 0 | 0 | 0 | 0 | 0 | 0 | 0 | 0 | 0 |

FIG. 1B

Small Particle Additive additive added to stabilizer

| Example | 7 | 25 | 3 | 14 | 11 | 13 | 8 | 21 | 30 | 31 | 32 | 15 | 22 | 16 | 23 | 24 |
|---|---|---|---|---|---|---|---|---|---|---|---|---|---|---|---|---|
| Irgafos 168 | | 40 | | 65.4 | 64.7 | 64.7 | | 45 | 25 | 33.3 | 30 | 65.4 | 45 | 65.4 | 45 | 45 |
| Irganox 1010 | 90 | 40 | 56 | 32.6 | 32.3 | 32.3 | 95 | 45 | 25 | 16.7 | 30 | 32.6 | 45 | 32.6 | 45 | 45 |
| Tinuvin 622LD | | | | | | | | | | | | | | | | |
| Chimassorb 944 | | | 38 | | | | | | | | 30 | | | | | |
| Low Melting Point Additives | | | | | | | | | | | | | | | | |
| Irganox 1076 | | | | | | | | | | | | | | | | |
| Glyceryl Monostearate (GMS) | | | | | | | | | | | | | | | | |
| Oleamide | | | | | | | | | | | | | | | | |
| Fatty Acid | | | | | | | | | | | | | | | | |
| Inert Fine Particle additives | | | | | | | | | | | | | | | | |
| Calcium Stearate RSN | 10 | 20 | | | | | | | | | | | | | | |
| Hydrotalcite DHT-4A | | | 6 | | | | | | | | | | | | | |
| Microthene F LDPE | | | | | | | | | | | 10 | | | | | |
| LLDPE | | | | | | | | | 50 | 50 | | | | | | |
| Talc ABT2500 | | | | | | | | | | | | 2 | 10 | 2 | 10 | |
| ADPRO AP 6120-HS | | | | | | | | | | | | | | | | 10 |
| Pelet Yield | 22% | 24% | 0% | 45% | 70% | 46% | 65% | 88% | 50% | 40% | 37% | 0% | 0% | 0% | 0% | 0% |
| % Stabilizer | 90 | 80 | 94 | 98 | 97 | 97 | 95 | 90 | 50 | 50 | 90 | 98 | 90 | 98 | 90 | 90 |
| %Irgafos | 0 | 50 | 0 | 67 | 67 | 67 | 0 | 50 | 50 | 67 | 33 | 67 | 50 | 67 | 50 | 50 |
| %Irganox | 100 | 50 | 60 | 33 | 33 | 33 | 100 | 50 | 50 | 33 | 33 | 33 | 50 | 67 | 50 | 50 |
| %Tinuvin | 0 | 0 | 0 | 0 | 0 | 0 | 0 | 0 | 0 | 0 | 0 | 0 | 0 | 0 | 0 | 0 |
| %Chimassorb | 0 | 0 | 40 | 0 | 0 | 0 | 0 | 0 | 0 | 0 | 33 | 0 | 0 | 0 | 0 | 0 |
| %Additive | 10 | 20 | 6 | 2 | 3 | 3 | 5 | 10 | 50 | 50 | 10 | 2 | 10 | 2 | 10 | 10 |
| %Low Melting | 0 | 0 | 0 | 0 | 0 | 0 | 0 | 0 | 0 | 0 | 0 | 0 | 0 | 0 | 0 | 0 |
| %Small Part. | 10 | 20 | 6 | 2 | 3 | 3 | 5 | 10 | 50 | 50 | 10 | 2 | 10 | 2 | 10 | 10 |

STABILIZATION SYSTEMS FOR POLYMERIC MATERIAL IN PELLET FORM

This is a continuation application of application 08/526,035, filed Sep. 8, 1995 now abandoned.

BACKGROUND OF THE APPLICATION

The present invention relates to the preparation, in pellet form, of stabilization systems for stabilizing polymeric materials against ultraviolet light and thermooxidative deterioration.

Polymeric materials are incorporated into many types of devices. Polymeric materials, however, are subject to deterioration from exposure to heat, light, etc. There are a large number of protective compounds or additives which are incorporated in polymeric materials to protect the polymeric materials during processing and during the life of the resulting plastic article against deterioration of physical properties. These compounds are classified as hindered (o-substituted) phenols, phosphites containing either aliphatic or aromatic groups, thioaliphatic esters, polymeric or monomeric hindered amine light stabilizers, etc. Some combinations of components such as tris(2,4-di-tert-butylphenyl)phosphite and pentaerythritol tetrakis 3-(3,5-di-tert-butyl-4hydroxyphenyl) propionate in ratios of 3:1 to 1:1 have been found to be particularly effective against polymer discoloration. These combinations are described in U.S. Pat. No. 4,187,212 to Zinke et al. and are sold commercially by Ciba-Geigy Corporation as Irganox B-215, Irganox B-225, etc.

The protective additives are typically supplied in powder form. The powder is generally a fine powder with a melting point of between 55° C. to 185° C., depending on the protective additive used. This powder form leads to difficulty in handling the additives. The additives are difficult to convey in the systems most commonly used in the plastics industry and significant losses of the powders occur during conveying. The materials are dusty and present a potential for dust explosion as well as potential health risk to workers who either inhale the dust or whose skin comes in contact with the dust. Additionally, these powdery materials are difficult to meter accurately.

The use of materials in pellet form would alleviate the problems described above. It would eliminate the dust that is inherently created in the handling of powders. With the elimination of the dust, the health and fire risks associated with the powder are substantially reduced or even eliminated. Pellet mills are often used to form compounds into pellets. The pellet mills, however, subject the compounds to shear forces. Different materials behave differently under the same shear conditions. It has been found that materials such as Irganox B-225 and Irganox B-215, for example, soften and form a fused mass during the attempt to convert them to pellet form. Similar experiences are encountered during attempts to produce pellets of pentaerytritol tetrakis 3-(3,5di-tert-butyl-4-hydroxyphenyl) propionate (commercially available under the name Irganox 1010 from Ciba-Geigy Corporation) or combinations of Irganox 1010 and hindered amine light stabilizers, such as dimethyl succinate polymer with 4-hydroxy-2,2,6,6-tetra methyl-1-piperidineethanol (commercially available under the name Tinuvin 622LD from Ciba-Geigy).

SUMMARY OF THE INVENTION

One object of the present invention is to provide a stabilizer in pellet form.

Another object is to provide a method for forming such a pellet.

Another object is to provide such a method which produces a good quality pellet in a high yield.

These and other objects will become apparent to those skilled in the art in light of the following disclosure and accompanying Figure.

In accordance with the invention, generally stated, a stabilizing system for stabilizing polymeric materials against ultraviolet light and thermooxidative deterioration is provided in which the stabilizing system is in pellet form. The pellet is formed from a homogeneous mixture of at least one stabilizing compound and a binding agent. The stabilizing compound comprising about 50% to about 98% by weight of the mixture and the binding agent comprises about 2% to about 50% by weight of the mixture. The binder is a compound derived from a fatty alcohol or a fatty acid (or a compound containing a fatty acid chain or a fatty alcohol chain) or a fatty acid or a fatty alcohol. The binder may be a combination of fatty acids or fatty alcohols. These fatty acids, fatty alcohols, and compounds derived from or containing fatty acids or fatty alcohols have a low melting points. Other binding agents may be lubricating compounds having a small particle size.

The fatty acids, fatty alcohols, or compounds derived therefrom have a melting temperature of between 50° C. and 100° C., and preferably between about 50° C. and about 80° C. These compounds comprises about 3%–10% of the homogeneous mixture. The compounds derived from fatty acids or fatty alcohols (or containing fatty acid chains or fatty alcohol chains) may be octadecyl 3,5-di-tert-butyl-4-hydroxy hydrocinnamate, glyceryl monostearate, or oleamide. The fatty acids may be stearic acid; palmitic acid, or a combination thereof.

The lubricating compound may be a polyolefin, such as a low density polyethylene, or calcium stearate and has a particle size less than 100 $\mu$. The low density polyethylene, when used, comprises about 2% to about 50%, and preferably about 3–15%, by weight of the homogeneous mixture. The calcium stearate, when used, comprises about 10–20% by weight of the homogeneous mixture.

The stabilizing compound may be a phosphite antioxidant, hindered phenol antioxidant, a hindered amine UV light stabilizers, or a combination thereof. The phosphite antioxidant is preferably tris(2,4,di-tert-butylphenyl) phosphite and the hindered phenol antioxidant is preferably pentaerythritol tetrakis 3-(3,5-di-tert-butyl-4-hydroxyphenyl)propionate. These two antioxidants may be combined in a 1:1 to 2:1 ratio. The hindered amine light stabilizer may be dimethyl succinate polymer with 4-hydroxy-2,2,6,6-tetra methyl-1-piperidineethanol or N,N'-bis(2,2,6,6-tetramethyl-4-piperidinyl)-1,6-hexanediamine polymer with 2,4,6-trichloro-1,3,5-triazine and 2,4,4-trimethyl-1,2-pentanamine. The mixtures of stabilizers tested included a combination of tris(2,4,di-tert-butylphenyl)phosphite and pentaerythritol tetrakis 3-(3,5-di-tert-butyl-4-hydroxyphenyl)propionate in a ratio of about 2:1 to about 1:1; a combination of dimethyl succinate polymer with 4-hydroxy-2,2,6,6-tetra methyl-1-piperidineethanol and pentaerythritol tetrakis 3-(3,5-di-tert-butyl-4-hydroxyphenyl)propionate in a ratio of about 5:1; and a combination of tris(2,4,di-tert-butylphenyl)phosphite, pentaerythritol tetrakis 3-(3,5-di-tert-butyl-4-hydroxyphenyl)propionate, and N,N'-bis(2,2,6,6-tetramethyl-4-piperidinyl)-1,6-hexanediamine polymer with 2,4,6-trichloro-1,3,5-triazine and 2,4,4-trimethyl-1,2-pentanamine in a ratio of 1:1:1.

The pellet is formed by combining the stabilizing compound(s) and the binding agent to produce a homogeneous dry mixture. The dry homogeneous mixture is fed into a pellet mill which transforms the mixture into a product including a pellet fraction and a powder fraction. The product is collected and the pellet fraction is separated from the powder fraction. The powder fraction may be recycled through the pellet mill to increase the pellet yield from the mixture. The various combinations have produced pellet yields from about 22% to about 90%.

DESCRIPTION OF THE FIGURES

FIGS. 1A and 1B together comprise a table in which the examples described below are grouped according to the binder added to the stabilizer mixture.

DESCRIPTION OF THE PREFERRED EMBODIMENT

Tris(2,4-di-tert-butylphenyl)phosphite (available from Ciba-Geigy under the name Irgafos 168), pentaerythritol tetrakis 3-(3,5-di-tert-butyl-4-hydroxyphenyl)propionate (available from Ciba-Geigy under the name Irganox 1010), dimethyl succinate polymer with 4-hydroxy-2,2,6,6-tetra methyl-1-piperidineethanol (available from Ciba-Geigy under the name Tinuvin 622LD) and N,N'-bis(2,2,6,6-tetramethyl-4-piperidinyl)-1,6, hexanediamine polymer with 2,4,6-trichloro-1,3,5-triazine and 2,4,4-trimethyl-1,2-pentanamine (available from Ciba-Geigy under the name Chimassorb 944 and has CAS reg. no. 70624-18-9) can be used as additives to protect polyolefins during processing of the polyolefin and the product made from the polyolefin from the deleterious effects of heat, light, etc. These compounds will be referred to throughout the specification by their tradenames. As is known, the Irgafos 168 and Irganox 1010 are antioxidants which protect plastics and polymeric materials from heat degradation. Irgafos 168 is a phosphite and Irganox 1010 is a hindered phenol. Tinuvin 622LD and Chimassorb 944 are hindered amines which protect plastics and other polymeric materials from UV light. Irgafos 168, Irganox 1010, and Tinuvin 622LD, are supplied in powder form and have melting points of about 180°–185° C., 110°–125° C., and 55°–70° C., respectively. Chimassorb 944, which is also supplied in powder form, has a softening range of about 100°–135° C. When Irganox 1010, Tinuvin 622LD, or Chimassorb 944 are placed in a pellet mill, either individually or in combination with each other or Irgafos 168, the pellet forming process causes the compounds to melt and fuse in the pellet mill if the components are above a certain ratio. When Irgafos 168 is placed in the pellet mill alone the Irgafos does not fuse and small pellets are produced. However, a large amount of powder exits the mill also.

The fact that the stabilizing compounds melt and fuse in the pellet mill obviously prevents the formation of pellets. It is believed that the shear forces in the pellet mill raise the temperature of the Irganox 1010, Tinuvin 622LD, and Chimassorb powders, causing the powders to melt and fuse when the stabilizing compounds are mixed in certain ratios. For example, when Irgafos 168 and Irganox 1010 are combined in a 7:3–9:1 ratio, pellets are formed. Yet, when the ratio becomes 2:1 (Irgafos 168:Irganox 1010) or 5:1 (Tinuvin 622LD:Irganox 1010) the compounds melt and fuse. The compounds when mixed together in a certain ratio may create a eutectic mixture which has a melting point lower than either of the compounds alone, thus preventing the formation of a pellet.

I have found that by (1) adding a fatty acid, a fatty alcohol, or a compound derived from a fatty acid or fatty alcohol having a low melting point (i.e. a melting point of around 50°–100° C. and preferably around 50° C.–80° C.); or (2) by adding a lubricating compound having a higher melting point, but which has a very fine particle size, the problems associated with melting and fusing of the stabilizers are substantially eliminated and the ability to form mixtures of Irganox 1010, Irgafos 168, Tinuvin 622LD, and Chimassorb 944 into pellets is highly enhanced.

The pellet is formed by combining the chosen stabilizers with the chosen additive in a mixer and mixing or blending the components together until a generally homogeneous mixture of the compounds is formed. The mixture, which is a powdery mixture, is then fed into a pellet mill which, as is known, forms the mixture into pellets under pressure. A pellet fraction and a powder fraction is produced and exits the pellet mill. The pellet fraction is separated from the powder fraction, and the powder fraction is recycled through the pellet mill.

The compounds derived from fatty acids and fatty alcohols include octadecyl, 3,5-di-tert-butyl-4-hydroxy hydrocinnamate (available from Ciba-Geigy under the name Irganox 1076, CAS #2082-79-3), glyceryl monostearate (CAS #31566-31-1), oleamide (CAS #301-02-0). The fatty acids used include a combination of stearic acid (CAS #'s 57-11-4) and palmitic acid (CAS#57-10-3), such as tallow acid. Irganox 1076 has a melting point of around 50°–55° C.; glyceryl monostearate has a melting point of about 59° C.; oleamide has a melting point of about 68°–78° C.; and the fatty acid combination consists of a blend of about 56% stearic acid and about 38% palmitic acid has a melting point of about 55°–60° C.

The use of Irganox 1076, when combined with Irganox 1010 alone, or a combination of Irganox 1010 and Tinuvin 622LD or Irgafos 168 produces very good results. When the Irganox 1076 made up only 5–10% of the homogeneous mixture, pellet yields were in the range of 80–90%. The use of glyceryl monostearate and oleamide in the range of 3–10% produced yields of between 70–85%. The use of the fatty acid combination in a range of 3–10% produced pellet yields of in the range of 45–55%.

The inert particles tested were chosen from the group including calcium stearate RSN 248D (CAS #1592-23-0), hydrotalcite, a magnesium aluminum hydroxy carbonate hydrate, (available from Kyowa Chemical Industry Company Ltd. from Kagawa, Japan, under the name Mitsui DHT-4A), a low density polyethylene or LDPE (available from Quantum Chemical of Cincinnati, Ohio under the name Microthene F), a linear low density polyethylene or LLDPE (available from Eastman Kodak under the name Tenite Polyethylene), Talc (a magnesium silicate available from Barretts Minerals, Inc. of Dillon, Mont. under the name ABT2500), and a polypropylene (available from Genesis Polymers of Marysville, Mich. under the name ADPRO AP 6120-HS). The ADPRO is made up of varying size particles, in which 95% of the particles are in the range of 354 $\mu$ to 841 $\mu$. The polypropylene becomes soft at about 155° C. and begins to melt at about 165° C. Microthene F has a particle size of about 20 $\mu$, a density of about 0.924 g/cc and a melt index of about 4.5; LLDPE has a particle size of about 1000 $\mu$, a density of about 0.925 g/cc and a melt index of about 0.9; talc has a particle size of about 25 $\mu$; and the calcium stearate has a melting point of about 155°–160° C. and a particle size of less than 75 $\mu$.

Of the small particles tried, only the LDPE and calcium stearate produced any yields. When the other additives were used, the stabilizers melted and fused, preventing the formation of pellets. The use of LDPE in a range of 2–50% produced pellet yields ranging between 40–88% and the use of calcium stearate in the range of 10–20% produced pellet yields of 22–24%. As the amount of LDPE was increased up to 10% of the homogeneous mixture, the pellet yield also increased. When the LDPE made up 50% of the homogeneous mixture, the yield dropped off and the amount of powder exiting the mill increased. The amount of LDPE can thus be increased to upwards of 50% of the mixture, or more. However, when such large amounts of LDPE are used, the powder fraction which exits the pellet mill is large, and the powder fraction will have to be recycled several times. Although large amounts of LDPE will produce pellets, it is not believed to be economically feasible for a large scale production of pellets. Thus, the LDPE preferably makes up no more than 15% of the homogeneous mixture which is fed into the pellet mill. Preferably, the LDPE is makes up about 5–15% of the homogeneous mixture when used.

The LDPE and calcium stearate are lubricating compounds and they may have reduced the friction between the stabilizing compounds and the mill and possibly became a heat sink. This prevented the stabilizers from reaching their melting point, and allowed the formation of pellets. The size of the polyethylene and the calcium stearate is believed to be important. Each of these has a particle size less than 100 $\mu$. The linear low density polyethylene, which has a particle size about 50× that of the LDPE, did not produce pellets, despite the fact that it is a lubricating compound. The talc and hydrotalcite which also have small particle sizes, however did not produce pellets. This may be due to the fact that they are abrasive and non-lubricating.

The pellet preferably includes around 80%–98% stabilizer and around 2%–50% additive, preferably the additive is 2–20% of the homogeneous mixture. The stabilizer mixture preferably is about 15–95% Irganox 1010 combined with about 0–65% Irgafos 168, about 0–80% Tinuvin 622LD, or about 0–30% Chimassorb 944, or combinations thereof. Preferably the Irganox 1010 and Irgafos 168 are mixed in a 1:1 or 1:2 ratio. The Irganox 1010 and Tinuvin 622LD are mixed preferably in a 1:5 ratio. The Chimassorb 944 was mixed in a 1:1:1 ratio Irganox 1010:Irgafos 168:Chimassorb 944. The fatty acids, fatty alcohols, and compounds derived therefrom make up about 0–20% of the homogeneous mixture, when used, and the polyethylenes and calcium stearate make up about 3–50% of the pellet when used.

EXAMPLE 1

Irganox 1010, 500 g. and Irgafos 168, 500 g., were placed in a laboratory mixer, model O-A, available from Paul O. Abbe, Inc. of Little Falls, N.J. No additive was included. The white, powdery mixture was dry blended for 20 minutes to produce a homogeneous mixture of the two compounds. The white dry blend was transferred to the hopper of a laboratory pellet mill model CL-3 available from the California Pellet Mill Company of Crawfordsville, Ind. The pellet mill was equipped with an L89 alloy steel ⅛"×½" die and was operating at about 250 rpm. The mixture of Irganox 1010 and Irgafos 168 was then fed from the hopper into the die cavity. As the dry blend began to pass through the die holes it began to melt. A glassy, yellowish/brown molten material was formed. No pellets could be produced in any significant quantity.

EXAMPLE 2

In the manner described in Example 1, Tinuvin 622LD, 1666 g., and 334 g. Irganox 1010 were blended and fed to the pellet mill. As in Example 1, no additives were included in the mixture. Shortly after starting to feed the dry blend to the die cavity a few pellets began to form. However, as the run progressed the mill jammed as a result of formation of glass-like fused material inside the die cavity.

EXAMPLE 3

In the manner described in Example 2, 1,120 g. Irganox 1010 and 760 g. Tinuvin 622LD were combined with 120 g. of a hydrotalcite like material, available under the name DHT-4A from Mitsui Corporation, were blended and fed to the pellet mill. This mixture was 94% stabilizer and 6% additive, by weight. The stabilizers were combined in a ratio of about 1.5:1, Irganox:Tinuvin. Results similar to those described in Example 2 were obtained, that is, no pellets were formed.

EXAMPLE 4

In the manner described in Example 2, 2374 g. Tinuvin 622LD and 476 g. Irganox 1010 were mixed with 150 g. Irganox 1076. The mixture was about 95% stabilizer and 5% additive. The stabilizer was combined in a ratio of Tinuvin 622LD to Irganox 1010 of about 5:1. The mixture was blended and fed to the pellet mill. Product was collected as it emerged from the die. The product mix contained pellets and powder. It was sieved on a U.S. standard sieve No. 10 separating the pellets from the powder fraction. The fractions were by weight 90% pellets and 10% powder.

EXAMPLE 5

In the manner described in Example 1, 1,334 g. Irgafos 168 and 666 g. Irganox 1010 were dry blended and fed to the pellet mill. No additives were included in the mixture. The pellet mill was equipped with a ⅛"×¾" die. A few pellets were produced, but the bulk of the material fused inside the die cavity.

EXAMPLE 6

In the manner described in Example 5, 100% Irganox 1010 was fed to the pellet mill without prior blending. A few pellets were produced, but the bulk of the Irganox 1010 fused inside the die cavity.

EXAMPLE 7

In the manner described in Example 6, 1,800 g. (90%) Irganox 1010 and 200 g. (10%) Calcium Stearate RSN 248D (Mallinckrodt Chemical, Inc.) were blended and fed to the pellet mill equipped with a ⅛"×¾" die. Pellets, in small quantities (22% maximum yield), were produced during successive recycling of the blend through the pellet mill. Majority of the material in the product mix collected was in powder form.

EXAMPLE 8

In the manner described in Example 7, 1,900 g. (95%) Irganox 1010 and 100 g. (5%) of a low density polyethylene (LDPE), available under the name Microthene F from Quantum Chemical of Cincinnati, Ohio, were blended and fed to the pellet mill. A product mix containing both pellets and powder was obtained. After separating the pellets from the powder fraction, using a U.S. standard sieve No. 10, the powder fraction was recycled through the pellet mill yielding additional product in pellet form. Pellet yield of this blend was 65%.

EXAMPLE 9

In the same manner described in Example 8, 1,900 g. (95%) Irganox 1010 and 100 g. (5%) Irganox 1076 were blended and fed to the pellet mill. Good quality pellets, at approximately 80% yield, were obtained.

EXAMPLE 10

In the same manner described in Example 9, 1,800 g. (90%) Irganox 1010 and 200 g. (10%) Irganox 1076 were blended and fed to the pellet mill. Good quality pellets, at approximately 80% yield, were obtained.

EXAMPLE 11

In the same manner described in Example 10, 1,941 g. (64.7%) Irgafos 168 and 969 g. (32.3%) Irganox 1010 were combined with 90 g. (3.0%) LDPE (Microthene F). The mixture was blended and fed to the pellet mill. Good quality pellets were produced at yields in excess of 70%.

EXAMPLES 12 THROUGH 16

In the same manner described in Example 11, the following components were blended (weight percent shown) prior to being fed to the pellet mill. Additives were added to a stabilizer mixture of Irgafos 168 and Irganox 1010, the Irgafos and Irganox being mixed in a ratio of about 2:1.) In Example 13, Irganox 1076 was included as the additive for the mixture. In Examples 13–16, inert particles were used as the additives. The results for each example are shown in the table below.

| Example # | 12 | 13 | 14 | 15 | 16 |
|---|---|---|---|---|---|
| Irgafos 168 | 61.5% | 64.7% | 65.4% | 65.4% | 65.4% |
| Irganox 1010 | 31.0% | 32.3% | 32.6% | 32.6% | 32.6% |
| Irganox 1076 | 7.5% | — | — | — | — |
| LDPE Microthene F | — | 3.0% | 2.0% | — | — |
| LLDPE | — | — | — | 2.0% | — |
| Talc ABT2500 | — | — | — | — | 2.0% |
| Pellet Yield | 75% | 46% | 45% | 0% | 0% |
| Pellet Quality | Good | Good | Good | Melted | Melted |

These Examples show that for a 2:1 combination of Irgafos 168 and Irganox 1010, Irganox 1076 and LDPE work well as binding agents. The Irganox 1076, which is present in small quantities (7.5% by weight) may become tacky or begin to melt before the stabilizers reach their melting points. Because the additive/binding agent and stabilizer form a homogeneous mixture, the Irganox 1076 binding agent is evenly dispersed among the stabilizer particles to bind the stabilizer particles together. The LDPE, because of its fine particle size, is able to coat the stabilizer particles and prevent melting of the stabilizer particles to allow pellet formation. The LLDPE (which has a particle size 55× the particle size of the LDPE) and the talc (which is abrasive) were not able to operate as effective binding agents. The LLDPE is not able to coat the stabilizer particles as efficiently as the LDPE to prevent melting, allowing the temperature of the stabilizer to rise above the stabilizer's melting point. Because of its abrasiveness, the talc may have increased the friction in the pellet mill.

Tests 11 and 13 had the same compositions, yet had differing results. This may be attributable to several factors, including the fact that the pellet mill may have been cooler during the test 13 (which had the lower yield). This indicates that the temperature of the mill may have an impact on the yield of the pellet forming process.

EXAMPLES 17 THROUGH 19

In the same manner described in Example 11, the following components were blended (weight percent shown) prior to being fed to the pellet mill. In Examples 17–19, Irgafos 168 and Irganox 1010 were combined in a ratio of 2:1. Low melting point compounds, as shown in the table, were used as additives. Results are shown for each example.

| Example # | 17 | 18 | 19 |
|---|---|---|---|
| Irgafos 168 | 64.7% | 64.7% | 64.7% |
| Irganox 1010 | 32.3% | 32.3% | 32.3% |
| Glyceryl Monostearate (GMS) | 3.0% | — | — |
| Oleamide | — | 3.0% | — |
| Tallow Acid | — | — | 3.00 |
| Pellet Yield | 79% | 43% | 45% |
| Pellet Quality | Good | Good | Good |

Glyceryl monostearate, oleamide, and tallow acid all have melting points between 50° C. and 80° C., which is 60°–135° C. below the melting point of Irgafos 168 and Irganox 1010. The binding particles were thus able to melt or become tacky and form the mixture into a pellet, when the binding particle was present in small quantities.

EXAMPLE 20

In the same manner described in Example 5, a mixture of 2,700 g. Irgafos 168 (90%) and 300 g. (10%) Irganox 1010 was blended prior to being fed to the pellet mill. Good quality pellets, at an 83% yield, was obtained. As noted above, it is believed that, when a certain Irgafos 168/Irganox 1010 ratio is reached, the two will form a eutectic mixture having a low melting point. At a 90:10 ratio, apparently the eutectic point at which the total composition melts has not been reached, and the two compounds can form pellets without the use of additives. When the Irganox 1010 makes up more than about 30% of the mixture, when no other binding agent is used, the eutectic point between Irganox 1010 and Irgafos 168 will be reached, and the compounds will begin melt, causing the pellet mill to jam.

EXAMPLES 21 THROUGH 24

In the same manner described in Example 11, Irgafos 168 and Irganox 1010 were combined in a ratio of 1:1 and mixed with selected additives. In Examples 21–24, an inert particle was added to the stabilizer. The components were blended (weight percent shown) prior to being fed to the pellet mill. Results are shown for each experiment.

| Example # | 21 | 22 | 23 | 24 |
|---|---|---|---|---|
| Irgafos 168 | 45.0% | 45.0% | 45.0% | 45.0% |
| Irganox 1010 | 45.0% | 45.0% | 45.0% | 45.0% |
| LDPE Microthene F | 10.0% | — | — | — |
| LLDPE | — | 10.0% | — | — |
| Talc ABT2500 | — | — | 10.0% | — |
| Polypropylene ADPRO AP 6120-RS | — | — | — | 10.0% |
| Pellet Yield | 88% | 0% | 0% | 0% |
| Pellet Quality | Good | Melted | Melted | Melted |

As above, with examples 13–16, LDPE operates well as a binding agent, even at a higher weight percent of the mixture, but LLDPE and talc do not. Polypropylene, which has a particle size 35× that of the LDPE, does not operate well as a binder, possibly for the same reasons as the LLDPE.

EXAMPLES 25 THROUGH 29

In the same manner described in Example 11, Irgafos 168 and Irganox 1010 were combined in a 1:1 ratio and mixed with an additive with a low melting point. The components were blended (weight percent shown) prior to being fed to the pellet mill. Results are shown for each experiment.

| Example # | 25 | 26 | 27 | 28 | 29 |
|---|---|---|---|---|---|
| Irgafos 168 | 40% | 45.0% | 45.0% | 45.0% | 45.0% |
| Irganox 1010 | 40% | 45.0% | 45.0% | 45.0% | 45.0% |
| Calcium Stearate 248D | 20% | — | — | — | — |
| Irganox 1076 | — | 10.0% | — | — | — |
| Glyceryl Monostearate | — | — | 10.0% | — | — |
| Oleamide | — | — | — | 10.0% | — |
| Tallow Acid | — | — | — | — | 10.0% |
| Pellet Yield | 24% | 82% | 85% | 74% | 55% |
| Pellet Quality | Good | Good | Good | Good | Good |

These examples are similar to Examples 12–16, but provide the binder at higher weight percent and combine the Irgafos 168 and Irganox 1010 in a different ratio. At these changed conditions, the Irganox 1076, glyceryl monostearate, oleamide, and tallow acid still function as binding agents and allow the stabilizers to be formed into pellets.

EXAMPLES 30–32

In Examples 30 and 31, a 1:1 and a 2:1 mixture of Irgafos 168 and Irganox 1010 were combined with Microthene F, wherein the Microthene F made up 50% of the homogeneous mixture. Both examples produced good pellets in yields of 50% and 40% respectively. However, as noted above, the number of times powder had to be recycled may make mixtures containing such high quantities of Microthene F uneconomical to produce on a large scale. In Example 32, a 1:1:1 mixture of Irgafos 168, Irganox 1010, and Chimassorb 944 was combined with Microthene F. The results are shown below.

| Example # | 30 | 31 | 32 |
|---|---|---|---|
| Irgafos 168 | 25% | 33.3% | 30% |
| Irganox 1010 | 25% | 16.7% | 30% |
| Chimassorb 944 | — | — | 30% |
| Microthene F LDPE | 50% | 50% | 10% |
| Pellet Yield | 50% | 40% | 37% |
| Pellet Quality | Good | Good | Good |

EXAMPLES 33–34

In examples 33 and 34, two higher ratios of Irgafos 168 and Irganox 1010 were combined to determine where the eutectic mixture of the two compounds begins. The results are shown below.

| Example # | 33 | 34 |
|---|---|---|
| Irgafos 168 | 80% | 70% |
| Irganox 1010 | 20% | 30% |
| Pellet Yield | 36% | 95% |
| Pellet Quality | Good | Good, but some fused pellets also resulted |

In the 70/30 mixture, pellets were produced, yet some melting began to occur. The melting however, was not enough to fuse all the material and prevent pellet formation. Thus, the eutectic mixture of Irgafos 168 and Irganox 1010 occurs somewhere between the ratio of 2.33:1 and 2:1.

The pellet yield for the tests have been shown. However, what is important is that the combinations produced pellets, rather than the pellet yield. As can be seen from examples 11 and 13, the temperature of the pellet mill can affect the pellet yield. Also, the pellet mill used and the size of the pellet mill produced can affect pellet yield.

It has become apparent that stabilizers may be formed into pellets when combined into a homogeneous mixture with a binding agent. The binding agents that have been found to work well are fatty alcohols, fatty acids, and compounds derived from fatty acids and fatty alcohols which have a melting point below that of the stabilizer, preferably between 50° C. and 100° C., and most preferably between 50° C. and 80° C. Lubricating compounds with small particle sizes also worked well.

As variations within the scope of the appended claims may be apparent to those skilled in the art, the foregoing description is set forth only for illustrative purposes and is not meant to be limiting. For example, although only Irganox 1010, Irgafos 168, Tinuvin 622LD, and Chimassorb 944 were used as stabilizers in the examples, other stabilizers could be used. Other protective additives could be included in the pellet as well. All that is necessary is that the binding agent comprise 2–15% of the homogeneous mixture from which the pellet is produced. These examples are merely illustrative.

I claim:

1. A stabilizing system for stabilizing polymeric materials against ultraviolet light and thermooxidative deterioration, the stabilizing system being in pellet form; the pellet being formed from a homogeneous dry mixture consisting essentially of a stabilizer and a melt preventing compound to substantially prevent melting of the stabilizer; the stabilizer being chosen from the group consisting essentially of hindered phenols, hindered amines, phosphites, and combinations thereof, and comprising about 50% to about 98% by weight of the homogeneous mixture; and the melt preventing compound comprising about 2% to about 50% by weight of the homogeneous mixture; the melt preventing compound being chosen from the group consisting of (a) polyolefins having a particle size of less then 100 $\mu$, (b) calcium stearates having a particle size of less then 100 $\mu$, (c) fatty alcohols, fatty acids, or a compound having a fatty acid or fatty alcohol chain which is used as an additive in polyolefins and which has a melting point of between 50° C. and 100° C., the processing of the stabilizer and melt preventing compound being performed without substantially melting the stabilizing compounds.

2. The stabilizing system of claim 1 wherein the fatty acid, fatty alcohol, or the compound having a fatty acid or fatty alcohol chain has a melting temperature of between about 50° C. and about 80° C.

3. The stabilizing system of claim 1 wherein the compound having a fatty acid or fatty alcohol chain is chosen from the group consisting of octadecyl 3,5-di-tert-butyl-4-hydroxy hydrocinnamate, glyceryl monostearate; and oleamide; and the fatty acid is chosen from the group consisting essentially of stearic acids, palmitic acids, and combinations thereof.

4. The stabilizing system of claim 3 wherein the melt preventing compound comprises about 3%–10% of the homogeneous mixture.

5. The stabilizing system of claim 1 wherein the polyolefin is a low density polyethylene.

6. The stabilizing system of claim 5 wherein the low density polyethylene comprises about 2% to about 50% by weight of the homogeneous mixture.

7. The stabilizing system of claim 6 wherein the low density polyethylene comprises about 3–15% by weight of the homogeneous mixture.

8. The stabilizing system of claim 1 wherein the calcium stearate comprises about 10–20% by weight of the homogeneous mixture.

9. The stabilizing system of claim 1 wherein the hindered amine is chosen from the group consisting of dimethyl succinate polymer with 4-hydroxy-2,2,6,6-tetra methyl-1-piperidineethanol and N,N'-bis(2,2,6,6-tetramethyl-4-piperidinyl)-1,6-hexanediamine polymer with 2,4,6-trichloro-1,3,5-triazine and 2,4,4-trimethyl-1,2-pentanamine.

10. The stabilizing system of claim 1 wherein the stabilizer in the homogeneous mixture includes a combination of tris(2,4,di-tert-butylphenyl)phosphite and pentaerythritol tetrakis 3-(3,5-di-tert-butyl-4-hydroxyphenyl) propionate.

11. The stabilizing system of claim 1 wherein the stabilizer in the homogeneous mixture includes a combination of (a) dimethyl succinate polymer with 4-hydroxy-2,2,6,6-tetra methyl-1-piperidineethanol and (b) pentaerythritol tetrakis 3-(3,5-di-tert-butyl-4-hydroxyphenyl) propionate.

12. The stabilizing system of claim 1 wherein the stabilizer in the homogeneous mixture includes a combination of (a) tris(2,4,di-tert-butylphenyl)phosphite, (b) pentaerytritol tetrakis 3-(3,5-di-tert-butyl-4-hydroxyphenyl) propionate, and (c) N,N'-bis(2,2,6,6-tetramethyl-4-piperidinyl)-1,6-hexanediamine polymer with 2,4,6-trichloro-1,3,5-triazine and 2,4,4-trimethyl-1,2-pentanamine.

13. The stabilizing system of claim 1 wherein the phosphites are triarylphosphites.

14. A stabilizing system for stabilizing polymeric materials against ultraviolet light and thermooxidative deterioration, the stabilizing system being in pellet form; the pellet being formed from a homogeneous mixture consisting essentially of a polymer stabilizing composition and a melt preventing compound which substantially prevents melting of the stabilizing composition during processing of the stabilizing composition and the melt preventing compound; the homogeneous mixture being substantially dry; the stabilizing composition comprising about 80% to about 98% by weight of the mixture and the melting preventing compound comprising about 2% to about 20% by weight of the mixture; the stabilizing composition being chosen from the group consisting essentially of (a) tris(2,4,di-tert-butylphenyl)phosphite, (b) pentaerythritol tetrakis 3-(3,5-di-tert-butyl-4-hydroxyphenyl) propionate, (c) dimethyl succinate polymer with 4-hydroxy-2,2,6,6-tetra methyl-1-piperidineethanol, and (d) N,N'-bis(2,2,6,6-tetramethyl-4-piperidinyl)-1,6-hexanediamine polymer with 2,4,6-trichloro-1,3,5-triazine and 2,4,4-trimethyl-1,2-pentanamine, and combinations thereof; the melt preventing compound being chosen from the group consisting essentially of (e) fatty alcohols and fatty acids, having a melting point of between 50° C. and 100° C., octadecyl 3,5-di-tert-butyl-4-hydroxy hydrocinnamate, glyceryl monostearate, and oleamide, (f) polyolefins having a particle size smaller than 100 μ, and (g) calcium stearates having a particle size smaller than 100 μ; wherein the melt preventing compounds of group (e) comprising 3–10% by weight of the homogeneous mixture when used; the melt preventing compounds of group (f) comprising 3–15% by weight of the homogeneous mixture when used; and the melt preventing compounds of group (g) comprising 10–20% by weight of the homogeneous mixture when used; the stabilizing compounds remaining substantially unmelted during processing of the stabilizing compounds and melt preventing compounds.

15. The stabilizing system of claim 14 wherein the fatty acid is chosen from the group consisting essentially of stearic acid, palmitic acid, and combinations thereof.

16. The stabilizing system of claim 14 wherein the polyolefin is a low density polyethylene.

17. The stabilizing system of claim 14 wherein the stabilizing composition consists essentially of tris(2,4,di-tert-butylphenyl)phosphite and pentaerythritol tetrakis 3-(3,5-di-tert-butyl-4-hydroxyphenyl) propionate mixed in a ratio of about 2:1 to about 1:1.

18. The stabilizing system of claim 14 wherein the components (a) and (b) of the stabilizer are combined in a ratio of about 5:1.

19. The stabilizing system of claim 14 wherein the components (a), (b), and (d) of the stabilizer are combined in a ratio of about 1:1:1.

20. A method of producing a stabilizer for polymeric materials in pellet form, wherein the pellet consists essentially of said stabilizer and a melt preventing compound which will substantially prevent melting of said stabilizer; the method comprising:

dry mixing at least one stabilizing compound and said melt preventing compound to produce a homogeneous substantially dry mixture wherein said stabilizing compound remains substantially unmelted; the at least one stabilizing compound being chosen from the group consisting essentially of tris(2,4,di-tert-butylphenyl) phosphite, pentaerythritol tetrakis 3-(3,5-di-tert-butyl-4-hydroxyphenyl) propionate, dimethyl succinate polymer with 4-hydroxy-2,2,6,6-tetra methyl-1-piperidineethanol, and N,N'-bis(2,2,6,6-tetramethyl-4-piperidinyl)-1,6-hexanediamine polymer with 2,4,6-trichloro-1,3,5-triazine and 2,4,4-trimethyl-1,2-pentanamine, and combinations thereof; the melt preventing compound being chosen from the group consisting essentially of (a) fatty acids and fatty alcohols having a melting point of between 50° C. and 100° C., or octadecyl 3,5-di-tert-butyl-4-hydroxy hydrocinnamate, glyceryl monostearate, and oleamide, (b) polyolefins having a particle size of less than 100 μ, and (c) calcium stearates having a particle size of less than 100 μ; the at least one stabilizing compound comprising approximately about 50% to about 98% by weight of the homogeneous mixture; the melt preventing compound comprising about 2% to about 50% by weight of the homogeneous mixture;

introducing the homogeneous mixture into a pellet mill;

operating the pellet mill to compress the homogeneous mixture into a product, the product having a pellet fraction and a powder fraction, the mill being operated so as to substantially prevent melting of the stabilizing agent;

collecting a product from the pellet mill; and separating the pellet fraction from the powder fraction.

21. The method of claim 20 including a step of recycling the powder fraction through the pellet mill.

22. The method of claim 20 wherein the fatty acid is chosen from the group consisting essentially of stearic acid, palmitic acid, and combinations thereof.

23. The method of claim 20 wherein the fatty acid or fatty alcohol has a melting temperature of between 50° C. and 80° C.

24. The method of claim 20 wherein the polyolefin is a low density polyethylene.

25. The method of claim 20 wherein the at least one stabilizing compound in the homogeneous mixture includes a combination of tris(2,4-di-tert-butylphenyl)phosphite and pentaerythritol tetrakis 3-(3,5-di-tert-butyl-4-hydroxyphenyl) propionate.

26. The method of claim 20 wherein the at least one stabilizer compound in the homogeneous mixture includes a combination of dimethyl succinate polymer with 4-hydroxy-2,2,6,6-tetra methyl-1-piperidineethanol and pentaerythritol tetrakis 3-(3,5-di-tert-butyl-4-hydroxyphenyl) propionate.

27. The method of claim 20 wherein the at least one stabilizer compound in the homogeneous mixture includes a combination of tris(2,4-di-tert-butylphenyl)phosphite, pentaerythritol tetrakis 3-(3,5-di-tert-butyl-4-hydroxyphenyl) propionate, and N,N'-bis(2,2,6,6-tetramethyl-4-piperidinyl)-1,6-hexanediamine polymer with 2,4,6-trichloro-1,3,5-triazine and 2,4,4-trimethyl-1,2-pentanamine.

28. The stabilizing system of claim 13 wherein the triarylphosphite is tris(2,4-di-tert-butylphenyl)phosphite and the hindered phenol is pentaerythritol tetrakis 3-(3,5-di-tert-butyl-4-hydroxyphenyl) propionate.

\* \* \* \* \*